US006362976B1

(12) United States Patent
Winters et al.

(10) Patent No.: US 6,362,976 B1
(45) Date of Patent: Mar. 26, 2002

(54) DUAL SILICONE KEYPAD ACTUATION

(75) Inventors: Philip D. Winters, Kokomo; Vineet Gupta, Noblesville, both of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/649,781

(22) Filed: Aug. 29, 2000

(51) Int. Cl.$^7$ .............................. H04B 1/03; H05K 5/02
(52) U.S. Cl. ........................ 361/814; 361/725; 361/680
(58) Field of Search .................................. 361/725, 680, 361/679, 683, 724, 720, 814; 400/472, 480; 455/347, 348

(56) References Cited

U.S. PATENT DOCUMENTS

| | | | | |
|---|---|---|---|---|
| 4,621,373 A | * | 11/1986 | Hodsdon | 455/347 |
| 5,341,434 A | * | 8/1994 | Kawamoto | 381/86 |
| 5,381,684 A | * | 1/1995 | Kawamura | 70/58 |
| 5,434,753 A | * | 7/1995 | Watanabe | 361/814 |
| 5,471,666 A | * | 11/1995 | Sugiyama et al. | 455/348 |
| 5,510,957 A | * | 4/1996 | Takagi | 361/814 |
| 5,610,376 A | * | 3/1997 | Takagi et al. | 200/50.01 |
| 5,900,829 A | * | 5/1999 | Gardner et al. | 341/26 |

* cited by examiner

Primary Examiner—Jeffrey Gaffin
Assistant Examiner—Thanh Phan
(74) Attorney, Agent, or Firm—Jimmy L. Funke

(57) ABSTRACT

A radio having a detachable pod assembly and a pair of silicone keypads. The first silicone keypad is located within the detachable pod assembly, while the second silicone keypad is closely coupled with a printed circuit board that is electrically coupled with a microprocessor based controller. When the pod assembly is snapped into the radio faceplate, there is preferably a 0.2 mm interference fit between the two silicone keypads. When the user depresses the first silicone keypad, the actuation forces depress the second silicone keypad in series. As the second silicone keypad is depressed, a carbon contact "pill" on the second silicone keypad contacts the printed circuit board and signals the circuit board's microprocessor that a button has been depressed. The microprocessor then directs the radio to respond accordingly.

16 Claims, 4 Drawing Sheets

DUAL SILICONE KEYPAD ACTUATION

TECHNICAL FIELD

The invention is generally related to radios and more particularly automotive radios having a partially or fully detachable faceplate.

BACKGROUND OF THE INVENTION

There are many radios that use silicone keypads in their design. The main purpose of the silicone keypad is to transfer motion of a button being depressed into a signal on a printed circuit board. As the user depresses the button, a dome containing a carbon "pill" on the silicone keypad collapses onto a circuit board, wherein the "pill" completes a circuit and signals the circuit board's microprocessor that a button has been depressed. The radio then responds accordingly.

Many radios use the silicone keypad as the button itself, thereby eliminating the need for extra plastic pieces in the assembly process. This saves the cost of the extra pieces as well as the time associated with assembling them.

Another feature among automotive radios is a fully detachable or partially detachable portion, sometimes referred to as a faceplate or pod assembly, which is desirable as a theft deterrent. Once the pod is removed, the radio is disabled and no further operations can occur until the pod assembly is replaced.

SUMMARY OF THE INVENTION

The present invention combines the use of silicone buttons and a detachable pod assembly into a single desirable product from an end user's standpoint.

The present invention is accomplished by locating the radio buttons (user interface) in the pod assembly of the radio. The radio buttons are a silicone keypad. The keypad is placed in the back portion of the pod assembly, and the top portion is placed on top of the keypad and the portions are fastened together. Together, the three portions (top, back, and keypad) make up the pod assembly.

The pod assembly may then be snapped into the radio faceplate by means of a plastic detach lever located in the radio faceplate. Behind the radio faceplate is another silicone keypad. This second silicone keypad is mounted on a printed circuit board and contains at least one carbon contact "pill".

When the pod assembly is snapped into the radio faceplate, there is preferably a 0.2 mm interference fit between the two silicone keypads. When the user depresses the first keypad, the actuation force depresses the second keypad in series. As the second keypad is depressed, the carbon contact "pills" of the second keypad contact the printed circuit board and signals the circuit board's microprocessor that a button has been depressed. The radio then responds accordingly.

The combination of features described above allows for a low cost, high content automotive radio that will meet end user needs. The present invention combines theft deterrence with low cost, user-friendly feel in a single radio.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
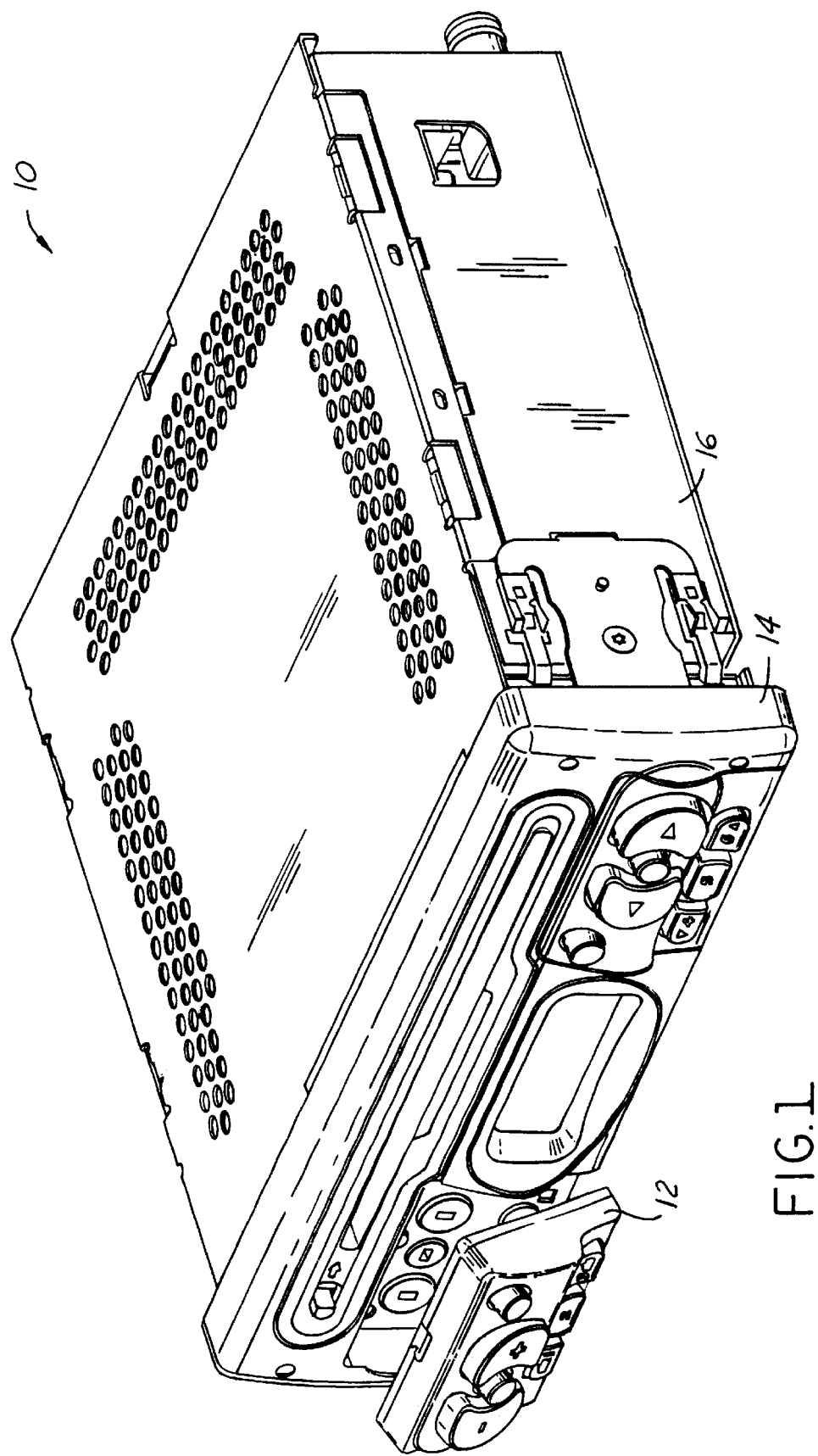
FIG. 1 is a perspective view of an automotive radio having a partially detachable pod assembly.

Referring now to FIG. 1, a radio 10 is shown according to a preferred embodiment of the present invention. The radio 10 has a pod assembly 12 that is detachable from the trimplate 14 of the main body 16.

Figure 2:
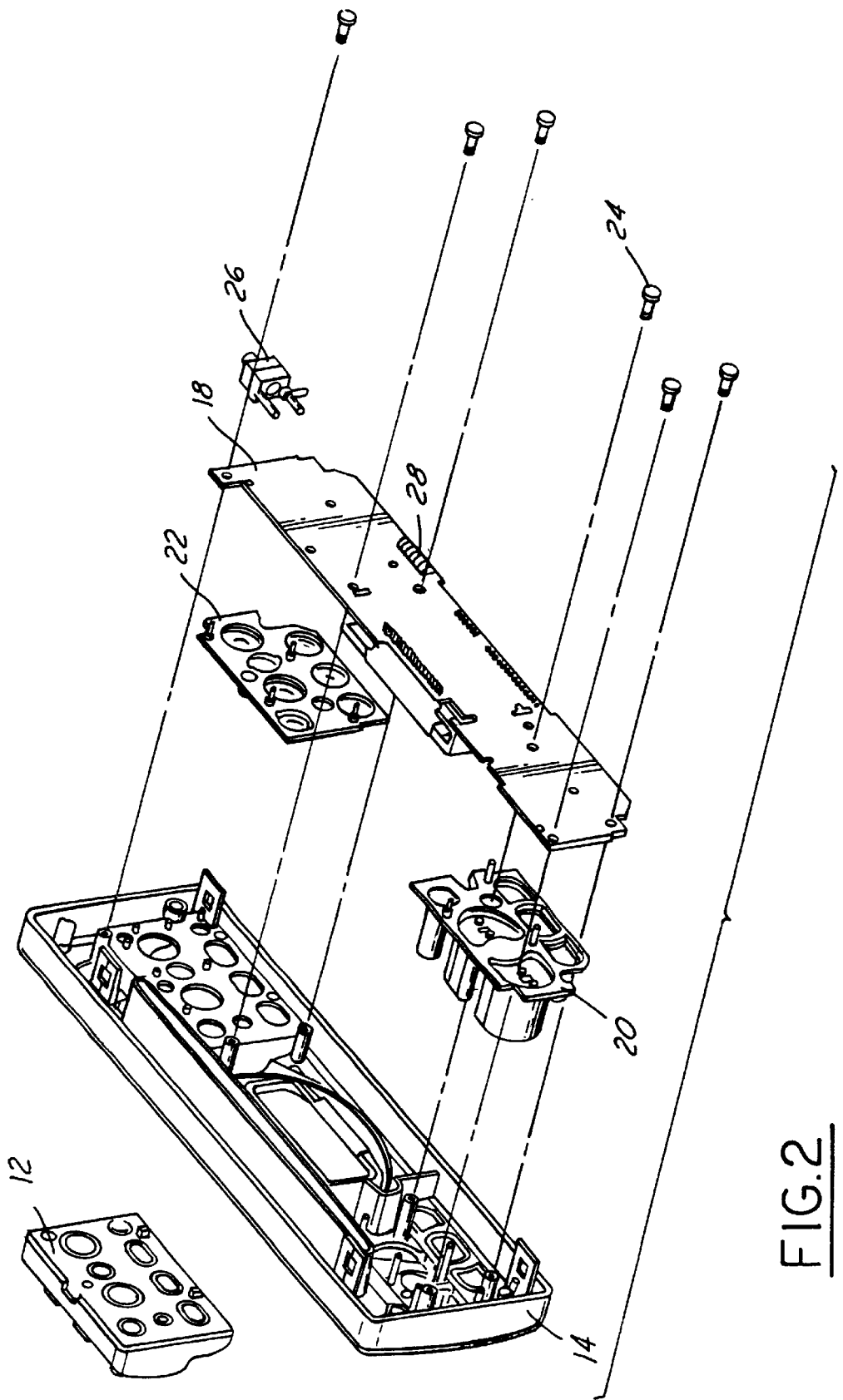
FIG. 2 depicts an exploded view of the radio components according to a preferred embodiment of the present invention.

As best seen in FIG. 2, the radio 10 also has a printed circuit board (PCB) assembly 18. The PCB assembly 18 is made of non-conductive material with several copper traces (not shown). The PCB assembly 18 may also have a plurality of small light emitting devices (shown as 40 in FIGS. 4 and 5), or LED's. The radio 10 further contains a first silicone keypad 20 that is attached to the pod assembly 12 and a second silicone keypad 22 that is attached between the trimplate 14 and the PCB assembly 18 by a series of screws 24. A detach-lever 26 is used to secure the pod assembly 12 into the trimplate 14. The detach-lever is preferably composed of plastic. A spring 28 is used to force the detach-lever 26 back into its home position after every use.

Figure 3:
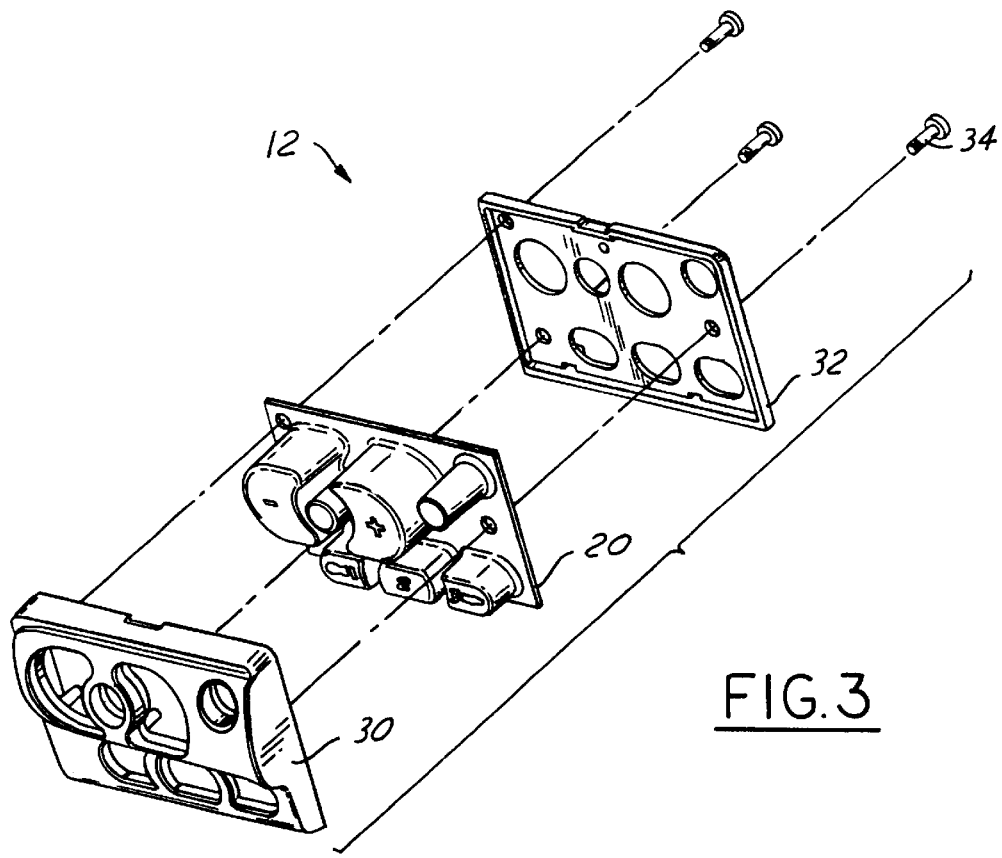
FIG. 3 is an exploded view of the pod assembly of the radio of FIG. 2.

As best seen in FIG. 3, the pod assembly 12 has the previously mentioned first silicone keypad 20 secured to a front body 30 and a back panel 32 by a second set of screws 34. Depending upon the design of the pod assembly 12, the second set of screws 34 could be replaced with a snap molded into the front body 30 or back panel 32. The front body 30 provides guidance to the first silicone keypad 20 and provides a pleasant appearance for the end user. The back panel 32 secures the first silicone keypad 20 within the pod assembly 12 and anchors the pod assembly 12 to the trimplate 14. The first silicone keypad 20 has a series of buttons 36 that are depressible through a series of openings 38 in the front body 30 and serves as the end user interface to signal the radio 10 that an action is required. The buttons 36 are preferably composed of translucent silicone.

Figure 5:
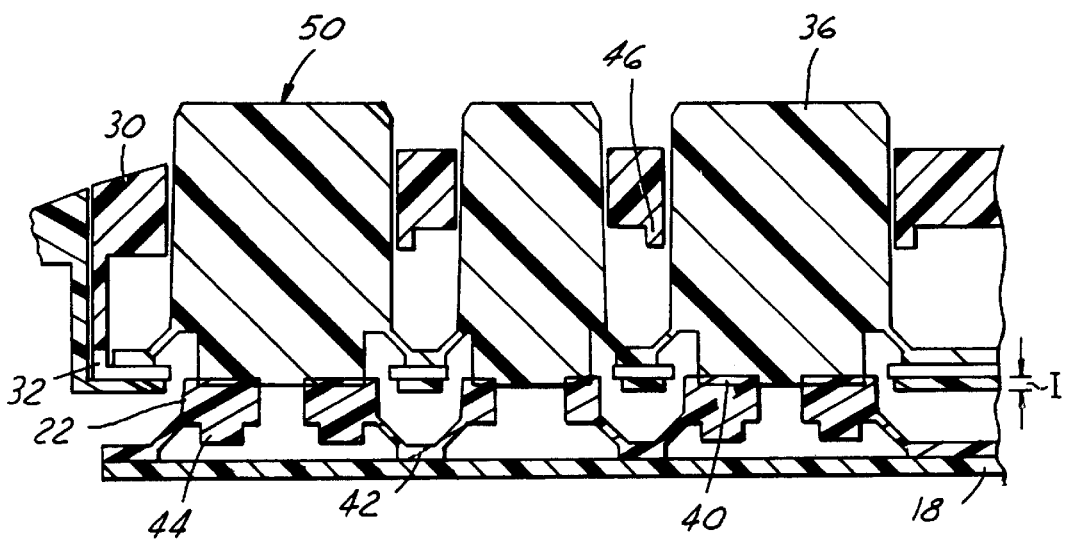
FIG. 5 is a perspective view of a portion of FIG. 4.
Figure 4:
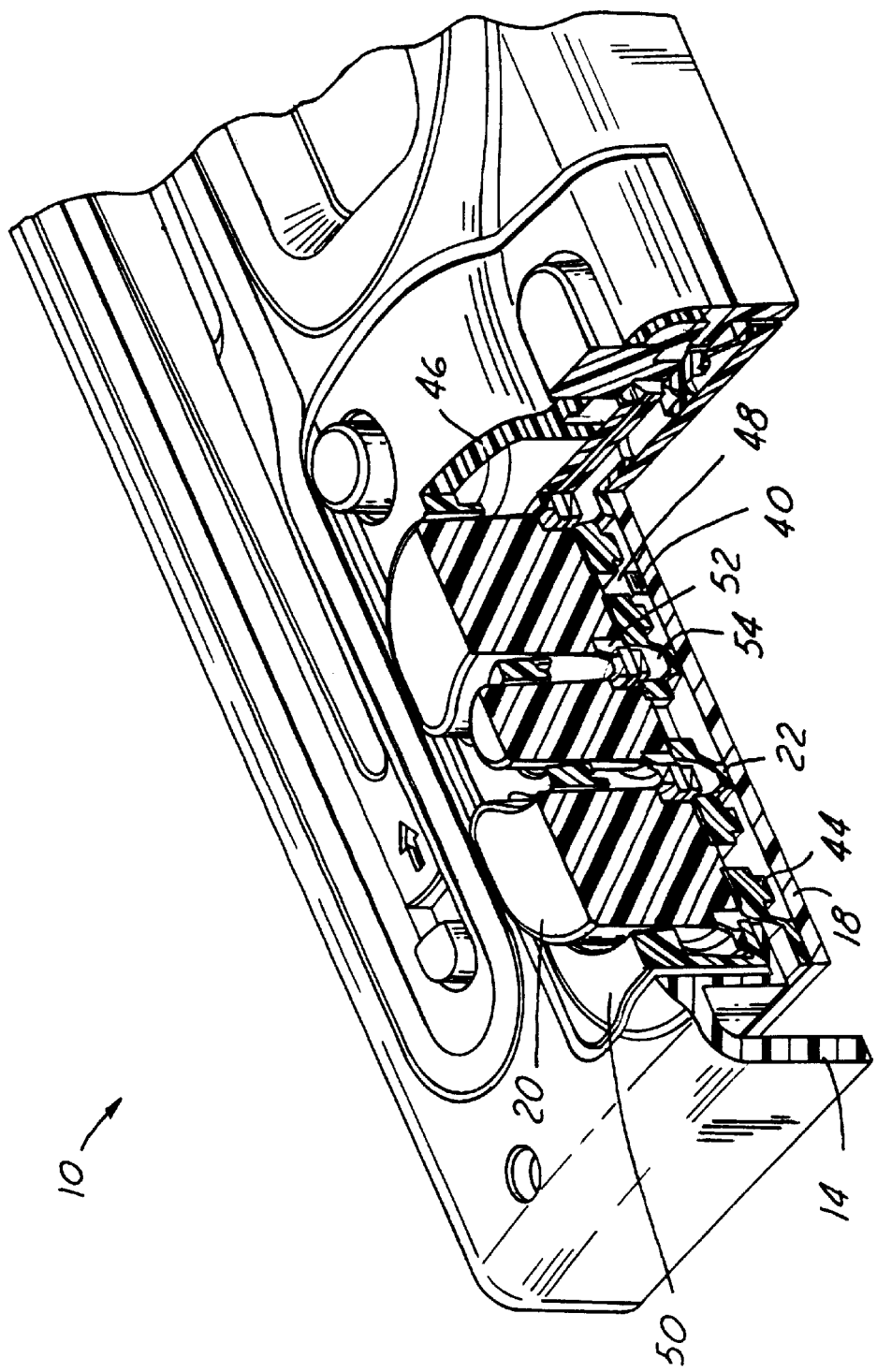
FIG. 4 depicts a cross-section of the entire radio assembly through the pod assembly in its nominally designed position according to a preferred embodiment of the present invention.

FIGS. 4 and 5 depict the radio wherein the pod assembly 12 is snapped into trimplate 14, allowing the radio 10 to be operable. The second silicone keypad 22 is comprised of a plurality of silicone domes 40 mounted at various points 42 on the PCB assembly 18. Each dome 40 has at least one carbon contact 44, or "pill", that is closely coupled with the PCB assembly 18 between the mounting points 42. A plurality of support posts 46 are molded into the front body 30 within the pod assembly 12 to prevent the pod assembly 12 from wobbling when the button 36 is depressed. In the normal, non-depressed position, there is an interference distance "I" of preferably 0.20 mm between each silicone button 36 and corresponding silicone dome 40. Further, the trimplate 14 and the back panel 32 are each preferably approximately 0.10 mm in thickness.

In addition, a series of LED's 40 may be added between the PCB assembly 18 and the buttons 36. Light from the LED's 40 passes through an opening 48 in the silicone domes 40 and projects through the translucent top surface 50 of the button 36. The light from the LED's 40 can be cycled on or off at various times depending upon the requirements of the design. A coating (not shown) may be applied to the top surface 50 of the button 36 or to other areas of the first silicone keypad 20 to control the amount of light that passes through to the end user.

When an operator depresses the button 36 in an attempt to effectuate an action, such as changing frequencies or volume, on the radio 10, the webbing 52 at the base of the button 36 collapses, allowing the button 36 to move towards the second silicone keypad 22. The webbing 52 is preferably approximately 0.10 mm thick. As the force of action acts upon the silicone dome 40, this in turn causes a second webbing 54 on the second silicon keypad 22 to collapse, thereby allowing the silicone dome 40, and specifically the carbon contacts 44 on the second silicone keypad 22, to move towards the PCB assembly 18. When the carbon contacts 44 come in contact with the copper traces (not shown) on the PCB assembly 18, a signal is generated which travels along the copper traces to a microprocessor unit (not shown). The microprocessor unit interprets this signal and triggers the radio 10 to respond accordingly as a function of the signal. The amount of interference "I", here preferably 0.20 mm, between the first silicone keypad 20 and the silicone dome 40 is a function of the amount of travel required by the buttons 36 or first silicone keypad 20 and is a function of the tactile feel requirements of the end user.

The combination of features described above allows for a low cost, high content automotive radio that will meet end user needs. The present invention combines theft deterrence with low cost, user-friendly feel in a single radio. This is accomplished by providing a dual silicone keypad actuation feature in a partially or fully detachable pod assembly.

While the invention has been described in terms of preferred embodiments, it will be understood, of course, that the invention is not limited thereto since modifications may be made by those skilled in the art, particularly in light of the foregoing teachings.

What is claimed is:

1. A radio for use in automotive applications, the radio comprising;
    a trimplate having an inner surface and an outer surface;
    a pod assembly capable of coupling and uncoupling with said outer surface of said trimplate, said pod assembly having a first silicone keypad secured between a front body and a back panel, said first silicone keypad having a plurality of silicone keypad buttons, wherein said pod assembly is capable of movement between a first position and a second position;
    a printed circuit board assembly coupled with a portion of said inner surface of said trimplate; and
    a second silicone keypad between said trimplate and said printed circuit board assembly, said second silicone keypad having a plurality of silicone domes, each of said plurality of silicone domes having at least one carbon contact in closest proximity to said printed circuit board assembly and a top portion in closest proximity with one of said plurality of silicone keypad buttons, wherein said second silicone keypad is capable of movement between a third and fourth position.

2. The radio of claim 1, wherein the distance between said top portion and said one of said plurality of silicone keypad buttons is approximately 0.20 mm when said first silicone keypad is in said first position.

3. The radio of claim 1, wherein said carbon contact is in contact with said printed circuit board when said second silicone keypad is in said fourth position.

4. The radio of claim 3, where the movement of said first silicone keypad from said first position to said second position causes said second silicone keypad to move from said third position to said fourth position.

5. The radio of claim 1 further comprising a microprocessor based controller electrically coupled to said printed circuit board, said microprocessor based controller capable of receiving signals from said printed circuit board when one of said carbon contacts is in contact with said printed circuit board.

6. The radio of claim 1 further comprising a detach-lever used to secure said pod assembly to said trimplate.

7. The radio of claim 1, wherein said plurality of silicone buttons and said first silicone keypad are translucent.

8. The radio of claim 7 further comprising a plurality of light emitting diodes coupled between said printed circuit board assembly and said second silicone keypad, each of said plurality of light emitting diodes capable of emitting light through an opening in said second silicone keypad to illuminate one of said plurality of silicone buttons and said second keypad.

9. The radio of claim 1, wherein said pod assembly further comprising at least one support post between each of said plurality of silicone buttons, said at least one support post capable of supporting said second silicone keypad.

10. The radio according to claim 1, wherein each of said plurality of silicone buttons having a webbing, wherein said webbing collapses when said first keypad is moved from said first position to said second position.

11. The radio according to claim 10, wherein each of said plurality of silicone domes having a second webbing, wherein said second webbing collapses when said second silicone keypad is moved from said third position to said fourth position.

12. A radio for use in automotive applications, the radio comprising;
    a trimplate having an inner surface and an outer surface;
    a pod assembly capable of coupling and uncoupling with said outer surface of said trimplate, said pod assembly having a first silicone keypad secured between a front body and a back panel, wherein said pod assembly is capable of movement between a first position and a second position;
    a printed circuit board assembly coupled with a portion of said inner surface of said trimplate; and
    a second silicone keypad between said trimplate and said printed circuit board assembly, said second silicone keypad having a plurality of silicone domes, each of said plurality of silicone domes having at least one carbon contact in closest proximity to said printed circuit board assembly and a top portion in closest proximity with said first silicone keypad, wherein said second silicone keypad is capable of movement between a third and fourth position.

13. The radio of claim 12, wherein the distance between said top portion and said first silicone keypad is approximately 0.20 mm when said first silicone keypad is in said first position.

14. The radio of claim 12, wherein said carbon contact is in contact with said printed circuit board when said second silicone keypad is in said fourth position.

15. The radio of claim 14, where the movement of said first silicone keypad from said first position to said second position causes said second silicone keypad to move from said third position to said fourth position.

16. The radio of claim 12 further comprising a microprocessor based controller electrically coupled to said printed circuit board, said microprocessor based controller capable of receiving signals from said printed circuit board when one of said carbon contacts is in contact with said printed circuit board.

* * * * *